United States Patent Office 3,042,006
Patented July 3, 1962

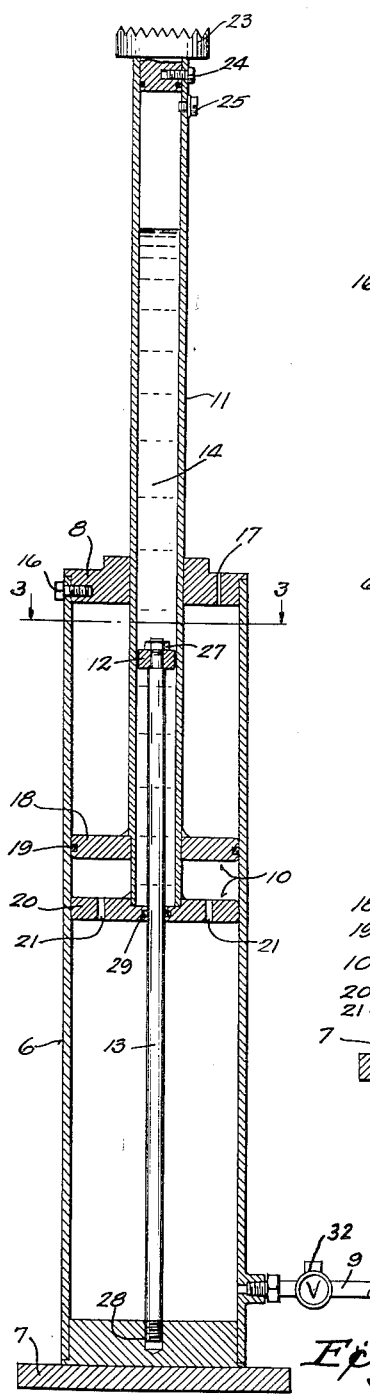
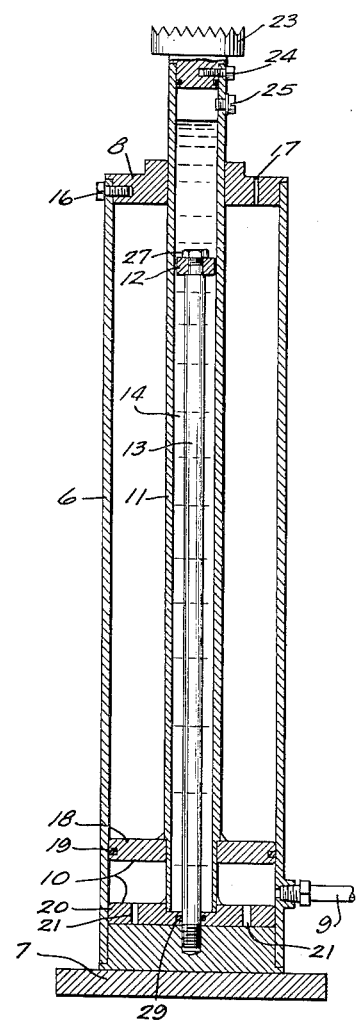
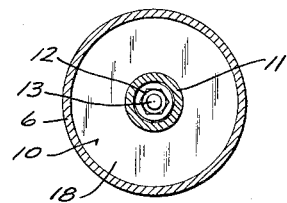
Fig. 3
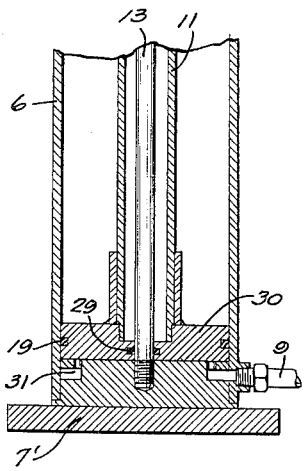
Fig. 2    Fig. 4
Fig. 1
INVENTOR.
BY J. R. Butorac
Lieber, Lieber & Nilles

3,042,006
FLUID PRESSURE ACTUATED POWER UNIT
John R. Buforac, Milwaukee, Wis., assignor to Applied Power Industries, Inc., a corporation of Wisconsin
Filed Nov. 14, 1960, Ser. No. 68,920
2 Claims. (Cl. 121—46)

The present invention relates generally to improvements in the art of applying power with the aid of fluid pressure, and it relates more specifically to improvements in the construction and operation of power applying units such as jacks operable by elastic fluid such as air or other gas under pressure.

The primary object of this invention is to provide an improved elastic fluid actuated power unit in which undesirable variable movements of the power delivery member are effectively dampened or retarded in either direction.

In shock absorbrs of the type wherein elastic fluid is utilized, attempts have heretofore been made to prevent excessive shock from being transmitted from one element to another by utilizing either an elastic fluid such as compressed air or an inelastic fluid such as liquid to provide a dampening effect. However, in these prior devices, the cushioning fluid is derived from the main piston chamber, the fluid for obtaining the dampening or cushioning effect being metered to the cushioning chamber from one or the other sides of the main piston.

Accordingly, while these prior devices may function adequately to merely prevent transmission of shock from one element to another, they cannot be effectively utilized for dampening or cushioning the action of an elastic fluid actuated power transmission device wherein the actuating fluid is admitted to and discharged from the piston displacement chamber because the utilization of the fluid in the power cylinder as by metering the same to and from an auxiliary cushioning chamber for dampening the movement of the piston would result in an ineffectual or completely inoperative force applying or power transmission device.

It is therefore an important object of the present invention to provide an improved fluid actuated device wherein a power delivery piston is moved by fluid pressure, while the movements of the piston are dampened or controlled from a separate fluid supply source which is sealed from the piston actuating fluid.

An extremely important object of this invention is to provide an improved elastic fluid pressure actuated jack or similar power actuator in which the advancement of the jack piston is dampened in a manner wherein the damping force increases non-linearly with an increase in acceleration of the piston speed either due to loss of load upon movement of the ram outwardly or in a reverse direction upon removal or loss of the fluid pressure motivating soruce.

Another important object of this invention is to provide an improved elastic fluid pressure actuated jack in which the advancement of the jack piston is dampened to prevent undesirable rapid movement thereof by a confined body of liquid associated with the piston.

A further important object of the invention is to provide an improved power device comprising a cylinder having therein a piston provided with a hollow power delivery rod the interior of which contains a confined body of fluid cooperable with a plunger to retard excessively rapid movement of the piston.

Still another important object of the invention is to provide an improved single acting compressed air actuated jack having a piston reciprocable within a cylinder and provided with a hollow rod the interior of which contains a sealed body of liquid cooperable with a fixed plunger to dampen the reciprocation of the piston.

These and other more specific objects and advantages of the invention will be apparent from the following detailed description.

A clear conception of the features constituting the present improvement, and of the construction and operation of a typical air pressure actuated jack embodying the invention, may be had by referring to the drawing accompanying and forming a part of this specification wherein like reference characters designate the same or similar parts in the various views.

FIGURE 1 is a central vertical section through an air actuated load lifting jack showing the piston subjected to compressed air and in an elevated position;

FIGURE 2 is a similar sectional view through the same jack but showing the piston fully retracted;

FIGURE 3 is a transverse horizontal section through the jack taken along the line 3—3 of FIGURE 1; and FIGURE 4 is a fragmentary central vertical section through the lower portion of a similar jack, but showing a modified piston.

While the invention has been illustrated and described herein as having been embodied in an air pressure actuated load lifting jack it is not intended to limit the use of the improvements to such a unit; and it is also contemplated that specific descriptive terms employed herein be given the broadest possible interpretation consistent with the disclosure.

Referring to FIGURES 1 to 3 inclusive of the drawing, the improved jack assemblage shown therein comprises in general, a cylinder 6 having lower and upper end closures 7, 8 respectively and being provided with a compressed air inlet and discharge conduit 9 near its lower extremity; a composite piston 10 reciprocable within the cylinder 6 and having a hollow power delivery rod 11 protruding through the upper cylinder closure 8; a plunger 12 fixedly located within the hollow piston rod 11 by an elongated strut 13 secured to the lower cylinder closure 9 and loosely cooperating with the interior of the reciprocable rod 11, and a body of liquid 14 confined within the hollow rod 11.

The cylinder 6 is normally disposed in approximately upright position so that the lower end closure 7 provides a base for the jack, and the upper end closure 8 is detachably secured to the cylinder by a cap screw 16 or the like in order to permit insertion or removal of the piston 10 and is provided with an orifice 17 for venting the cylinder interior above this piston, see FIGURES 1 and 2. The compressed air supply and exhaust conduit 9 may communicate with any suitable source of the actuating fluid for elevating the piston 10, and with a release valve for effecting lowering of this piston by gravity, in a well known manner.

The composite piston 10 shown in FIGURES 1 and 2, comprises an upper disk 18 provided with an O-ring seal 19 coacting with the internal bore of the cylinder 6, and a lower disk 20 spaced from the disk 18 and slidably cooperating with the cylinder bore but being provided with several through passages 21, thus exposing both disks 18, 20 to the lower piston displacement chamber 22. Both of the piston disks 18, 20 are secured as by welding to the lower extremity of the tubular piston rod 11 the upper end of which is provided with a removable work engaging shoe 23 secured to the rod by a cap screw 24, and the upper portion of the rod 11 may also be provided in addition to the removable shoe with a liquid supply opening which may normally be sealed by a cap screw 25.

The plunger 12 of the improved piston motion dampening assemblage and which is held in fixed position relative to the cylinder 6 by the elongated strut 13, of slightly less diameter than the internal bore of the tubular piston rod 11 thus providing a restricted passage for liquid in the confined body 14 from one side of the plunger 12 to the other and vice versa, during reciprocation of the piston and rod. The rate of this transfer of liquid depends upon the magnitude of the bypass passage, and the volume of the confined liquid body 14 should be sufficient to cover the plunger 12 when the piston 10 is in lowermost position. The plunger 12 is detachably secured to the upper end of the strut 13 by a nut 27, and the lower end of this strut may be detachably secured by screw threads 28 to the base closure 7, and the piston disk 20 is provided with an O-ring 29 coacting with the fixed strut 13 to seal the confined liquid body 14 from the piston displacement chamber 22.

When the improved jack has been properly constructed and assembled, the piston 6 and rod 11 may be elevated by the admission of compressed air to the lower displacement chamber 22 as by means of a three-way valve 32, and during such ascent, liquid from the body 14 will flow upwardly past the fixed plunger 12 and will thereby dampen or retard the upward movement of the work engaging shoe 23 to an extent dependent upon the size of the bypass passage between the plunger 12 and internal bore of the rod 11. When the direction of travel of the shoe 23 is reversed by releasing the compressed air from within the chamber 22, there will be an initial uncontrolled descent of the piston 10 and rod 11 until the difference in liquid volume due to the displacement effected by the strut 13 has been compensated for, whereupon the downward movement of the shoe 23 will again be dampened or retarded by the by-passing liquid, and it has been noted that in the event of a sudden release of the load or sudden removal of the fluid pressure source acting on the lower face of the piston 10 the advancement of the jack piston is effectively dampened with increased effect by reason of the non-elastic nature of the damping fluid 14 coupled with the restricted passage through which the fluid is metered.

The improved motion dampening device thus functions to prevent undesirably rapid travel of the piston 10 and rod 11 especially while the shoe 22 is being elevated and in case the load coacting with the work engaging shoe 22 is suddenly released or lost; and this dampening or retarding effect may be readily varied by predetermining the magnitude of the passage for liquid around the plunger 12.

While the composite piston 10 shown in FIGURES 1 and 2 insures rapid and uniform application of the compressed fluid to the entire piston area, a single disk piston 30 such as illustrated in FIGURE 4 may also be utilized. In this modification both of the O-ring seals 19, 29 may be applied to the single piston disk and the base closure 7' for the cylinder 6 should preferably be modified to provide an annular air admission and discharge passage 31 connecting the conduit 9 with the piston displacement chamber.

From the foregoing description it should be apparent that the present invention in fact provides a fluid pressure actuated power unit in which undesirably rapidly varying movements of the power delivery member in either direction are effectively dampened. The device is simple and compact in structure, and may be conveniently assembled or dismantled, but an important feature of the device is that the dampening liquid is confined and sealed from escape into the piston displacement chambers, thus insuring effective dampening at all times and in any position of the piston without loss of efficiency in power or force application.

Various modes of carrying out the invention are contemplated as being within the scope of the following claims particularly pointing out and distinctly claiming the subject matter which is regarded as the invention.

I claim:

1. In an air actuated power unit, a cylinder, a pair of spaced piston elements forming disks joined together for reciprocable movement within said cylinder by a tubular power applying rod, one of said disks having ports communicating with opposite sides thereof, means for introducing elastic fluid under pressure into said cylinder between said disks to move said piston disks and rod relative to said cylinder, a plunger fixedly secured to said cylinder and dividing the interior of said rod into separate chambers interconnected past the plunger by a restricted passage, and a body of liquid confined within said rod, said plunger being constantly immersed within said liquid body and the liquid being transferrable through said passage from one of said chambers to the other to dampen the reciprocatory movement of said piston throughout its stroke in either direction.

2. In an air actuated power unit, a cylinder, a pair of spaced disks forming a piston reciprocable within said cylinder, said disks having a hollow rod secured thereto and extending outwardly beyond the cylinder, and the end one of said disks having ports communicating with opposite sides thereof, means for introducing air under pressure into said cylinder between said disks to move said piston and rod relative to the cylinder, a plunger secured to said cylinder and dividing the interior of said rod into separate chambers, said plunger being of less diameter than the interior of said rod to provide a restricted passage, and a body of liquid confined within said rod and constantly covering said plunger, said liquid being transferrable through said passage from one of said chambers to the other to retard the movement of said piston.

References Cited in the file of this patent

UNITED STATES PATENTS

| | | |
|---|---|---|
| 582,092 | Ridgway | May 4, 1897 |
| 706,276 | Stumpf | Aug. 5, 1902 |
| 778,168 | Bramwell | Dec. 20, 1904 |
| 2,581,660 | Horton | Jan. 8, 1952 |